United States Patent
Ganesan et al.

(10) Patent No.: US 11,229,042 B2
(45) Date of Patent: Jan. 18, 2022

(54) METHOD AND APPARATUS FOR DETERMINING AND COMMUNICATING MULTI-STAGE SIDELINK CONTROL INFORMATION

(71) Applicant: Lenovo (Singapore) Pte. Ltd., New Tech Park (SG)

(72) Inventors: Karthikeyan Ganesan, Kaiserslautern (DE); Prateek Basu Mallick, Langen (DE); Joachim Löhr, Wiesbaden (DE); Alexander Johann Maria Golitschek Edler von Elbwart, Darmstadt (DE); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 30 days.

(21) Appl. No.: 16/785,471

(22) Filed: Feb. 7, 2020

(65) Prior Publication Data
US 2020/0260472 A1    Aug. 13, 2020

Related U.S. Application Data

(60) Provisional application No. 62/804,664, filed on Feb. 12, 2019.

(51) Int. Cl.
*H04W 72/12* (2009.01)
*H04L 1/08* (2006.01)
*H04W 4/40* (2018.01)

(52) U.S. Cl.
CPC .......... *H04W 72/1278* (2013.01); *H04L 1/08* (2013.01); *H04W 72/121* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2016/0128028 A1* | 5/2016 | Mallik | H04L 5/0053 370/336 |
| 2017/0366328 A1* | 12/2017 | Seo | H04L 1/0009 |
| 2019/0124491 A1* | 4/2019 | Lim | H04W 4/40 |
| 2019/0364562 A1* | 11/2019 | Chae | H04L 5/0055 |
| 2020/0228247 A1* | 7/2020 | Guo | H04L 1/1854 |
| 2020/0228949 A1* | 7/2020 | Bharadwaj | H04L 5/0094 |
| 2020/0229171 A1* | 7/2020 | Khoryaev | H04W 72/08 |

OTHER PUBLICATIONS

Interdigital Inc., On Physical Layer Structure Design, R1-1813226, 3GPP TSG Ran WG1 Meeting #95, Spokane, USA, Nov. 12-16, 2018.
Ericsson, On 2-stage PSCCH design, R1-1813648, 3GPP TSG-Ran WG1 Meeting #95, Spokane, WA, US, Nov. 12-16, 2018.
(Continued)

*Primary Examiner* — Mewale A Ambaye
(74) *Attorney, Agent, or Firm* — Loppnow & Chapa; Matthew C. Loppnow

(57) ABSTRACT

First stage SCI can be determined. The first stage SCI including information can indicate whether or not a second stage SCI is being transmitted. The first stage SCI can be periodically transmitted. The second stage SCI can be determined. The second stage SCI can be transmitted.

20 Claims, 13 Drawing Sheets

(56) References Cited

OTHER PUBLICATIONS

Mediatek Inc., On sidelink physical layer structure, R1-1900196, 3GPP TSG Ran WG1 Ad-Hoc Meeting 1901, Taipei, Taiwan, Jan. 21-25, 2019.

Fraunhofer, Analysis and Design of V2X Resource Entities, R1-1900354, 3GPP TSG Ran WG1 Meeting AH1901, Taipei, Taiwan, Jan. 21-25, 2019.

Lee, Optimal Spectrum Sensing Framework for Cognitive Radio Networks, IEEE Transactions on Wireless Communications, vol. 7, No. 10, Oct. 2008.

Duran, International Search Report, International Application No. PCT/IB2020/050994, European Patent Office, Rijswijk, NL, dated Apr. 15, 2020.

Ericsson: "On 2-stage PSCCH design", 3GPP Draft; R1-1813648 Ericsson—On 2-Stage PSCCH Design, 3rd Generation Partnership Project (3GPP), Mobile Competence Centre ; 650, Route Des Lucioles ; F-06921 Sophia-Antipolis Cedex ; France, vol. Ran WG1, No. Spokane, WA, US; Nov. 12, 2018-Nov. 16, 2018 Nov. 11, 2018.

Interdigital Inc: "On Physical Layer Structure Design", 3GPP Draft; R1-1813226 on Physical Layer Structure Design, 3rd Generation Partnership Project (3GPP), Mobile Competence Centre 650, Route Des Lucioles ; F-06921 Sophia-Antipolis Cedex ; FRANCE, vol. Ran WG1, No. Spokane, USA; Nov. 12, 2018-Nov. 16, 2018 Nov. 11, 2018.

Interdigital Inc: "Physical Layer Structure for NR V2X Sidelink", 3GPP Draft; R1-1900793 Physical Layer Structure for NR V2X Sidelink, 3rd Generation Partnership Project (3GPP), Mobile Competence Centre; 650, Route Des Lucioles ; F-06921 Sophia-Antipolis Cedex ; FR vol. Ran WG1, No. Taipei, Taiwan; Jan. 21, 2019-Jan. 25, 2019 Jan. 20, 2019.

* cited by examiner

METHOD AND APPARATUS FOR DETERMINING AND COMMUNICATING MULTI-STAGE SIDELINK CONTROL INFORMATION

BACKGROUND

1. Field

The present disclosure is directed to a method and apparatus for communicating two stage Sidelink Control Information (SCI).

2. Introduction

Presently, wireless communication devices, such as User Equipment (UE), communicate with other communication devices using wireless signals. Control channel structure and procedure enhancement can be used in New Radio (NR) Vehicle to Everything (V2x) to support different SCI formats and different aggregation levels and still maintain the same decoding complexity as that of Long Term Evolution (LTE) V2x. In LTE Vehicle-to-everything (V2x), Physical Sidelink Control Channel (PSCCH) is defined to carry a Scheduling Assignment (SA), which is required by UE to properly detect and decode the corresponding Physical Sidelink Shared Channel (PSSCH). For example, Sidelink Control Information (SCI) is transmitted over the PSCCH, which carries the information related to the transmission of data over the PSSCH.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

According to a possible embodiment, first stage SCI can be determined. The first stage SCI including information can indicate whether or not a second stage SCI is being transmitted. The first stage SCI can be periodically transmitted. The second stage SCI can be determined. The second stage SCI can be transmitted. At least some embodiments can provide a procedure for multi-stage SCI design for NR V2x. At least some embodiments can provide information on scheduling enhancement for multi-stage SCI for Unicast (UC) and Groupcast (GC) transmission.

Figure 1:
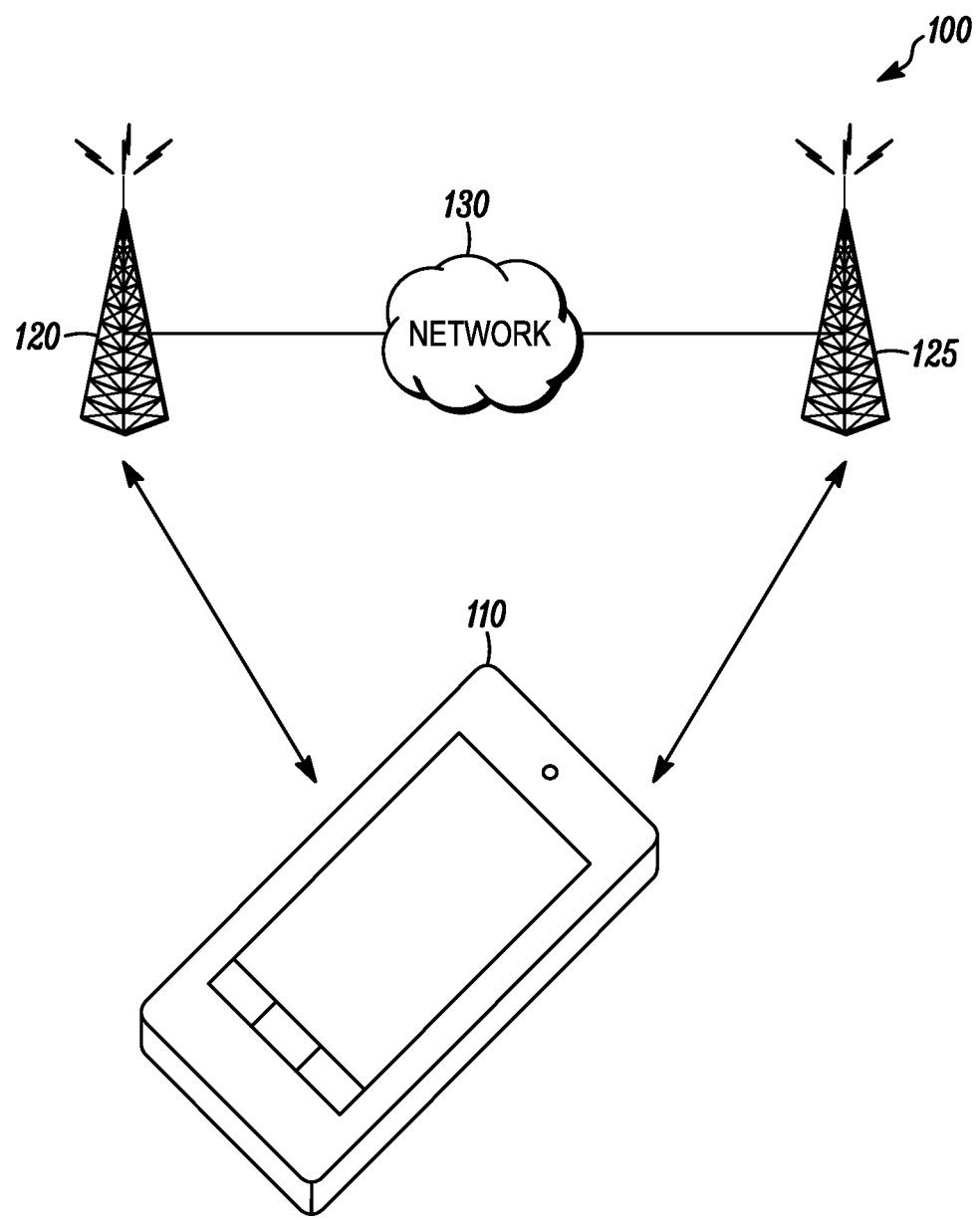
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, a vehicle, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

The UE 110 can also communicate with other UEs (not shown) by using V2x. NR V2x can support UC, GC, and Broadcast (BC) types of traffic. There can be multiple SCI formats due to different transmission mode settings for UC, GC, and BC transmission, which can increase the UE blind decoding complexity. Also, the data for UC or GC generally should only be known to the destination UEs or a destination group of UEs, respectively, and the data generally should be protected from anonymous UEs that are not part of the destination groups.

Due to the BC nature of the majority of V2x applications and also as part of sensing procedure for selecting empty resources, all UEs can monitor and decode PSCCH. Therefore, to keep the blind decoding complexity of the UE to a reasonable level, only one SCI format and fixed location of PSCCH within the allocated resources can be defined.

The content of SCI format 1, which can be used to schedule PSSCH, mainly designed for LTE V2x, is detailed in Table 1.

TABLE 1

| | |
|---|---|
| Priority | 3 bits |
| Resource reservation | 4 bits |
| Frequency resource location of initial transmission and retransmission | $\lceil \log_2(N_{subchannel}^{SL} (N_{subchannel}^{SL} + 1)/2) \rceil$ |
| Time gap between initial transmission and retransmission | 4 bits |
| Modulation and coding scheme | 5 bits |
| Retransmission index | 1 bit |
| Transmission format | 1 bit |

In the current NR Release 16 (R16) V2x discussion, 2 stage SCI can be considered with the main motivation being to separate the sensing procedure, which can be broadcasted to all UEs, with that of the grant required to decode for the UC & GC transmission. Second stage SCI can also be protected with Cyclic Redundancy Check (CRC) masked by a Layer 1 destination Identifier (ID) so that only the intended UE can decode the information. The second stage SCI can also be transmitted in the data region as part of PSSCH resource which can offload some control channel resources to the data region.

For PSCCH, a Layer-1 destination ID can be explicitly included in SCI. A Layer-1 source ID can also be included in SCI. A Hybrid Automatic Repeat Request (HARQ) process ID can also be included in SCI. A New Data Indicator (NDI) can also be included in SCI. A Redundancy Version (RV) can also be included in SCI. Some of the above information may or may not be present in some operations, such as depending on whether they are used for UC, GC, BC, and/or other operations.

Although motivation for proposing two stage SCI can be to reduce the blind decoding complexity during sensing and privacy for UC/GC transmission, some scheduling optimization in the control channel resources can be considered, such as when to transmit the second stage SCI, whether the second stage SCI should be transmitted all the time, and/or whether it should be event driven for UC and GC transmissions.

In one possible operation, separation of the SCI into two parts can be used for GC or UC sidelink transmission. The SCI part 1 can be related to resource reservation and can be BC to all UEs. The SCI part 2 can be used for BC, UC, and/or GC. If SCI part 2 is related to UC or GC, it may only be known to the destination UEs. If the SCI part 2 has its CRC masked by an ID associated with UC or GC sidelink, then it can be more protected.

One possible 2-stage PSCCH design can follow the principle of keeping the first stage SCI as small as possible with fixed pre-defined search space. This can enable flexibility of NR V2x when different use cases and scenarios need to be considered in a distributed manner. The first stage SCI can point to the exact time and frequency resources and format of the second stage SCI and indicate the SCI format. In contrast, the second stage SCI can be flexible in terms of time and frequency locations as well as SCI formats.

In another possible operation, SCI can split into two parts, where SCI part 1 can include the location of time-frequency resource used by PSSCH, resource reservation, priority and SCI part 2 can contain the rest of SCI. SCI part 1 and SCI part 2 can be encoded separately. No CRC scrambling may be performed on SCI part 1 so that all UEs can decode SCI part 1. SCI part 2 can be CRC scrambled by UE-specific Radio Network Temporary Identifier (RNTI) or group RNTI so that only the intended UEs can learn SCI part 2 and further decode PSSCH. SCI part 1 can be carried by PSCCH and SCI part 2 can be piggybacked on PSSCH or the SCI part 2 occupies the PSSCH resource.

In another possible operation, pre-emptive reservation and announcement messages can be control messages without any data linked to it, but can instead point to other control messages. In a possible operation for LTE Uu interface two stage design, two stage PDCCH with DCI flag and DCI format size indicator can be used.

In the present disclosure, the term eNB/gNB can be used for a base station, but it can be replaceable by any other radio access node, such as a Base Station (BS), an eNB, a gNB, an Access Point (AP), and other radio access nodes. Furthermore, disclosed embodiments are described mainly in the context of 5G NR. However, the embodiments are also equally applicable to other mobile communication systems supporting serving cells/carriers being configured for sidelink communication, such as over a PC5 interface, or configured for other communications.

Figure 2:
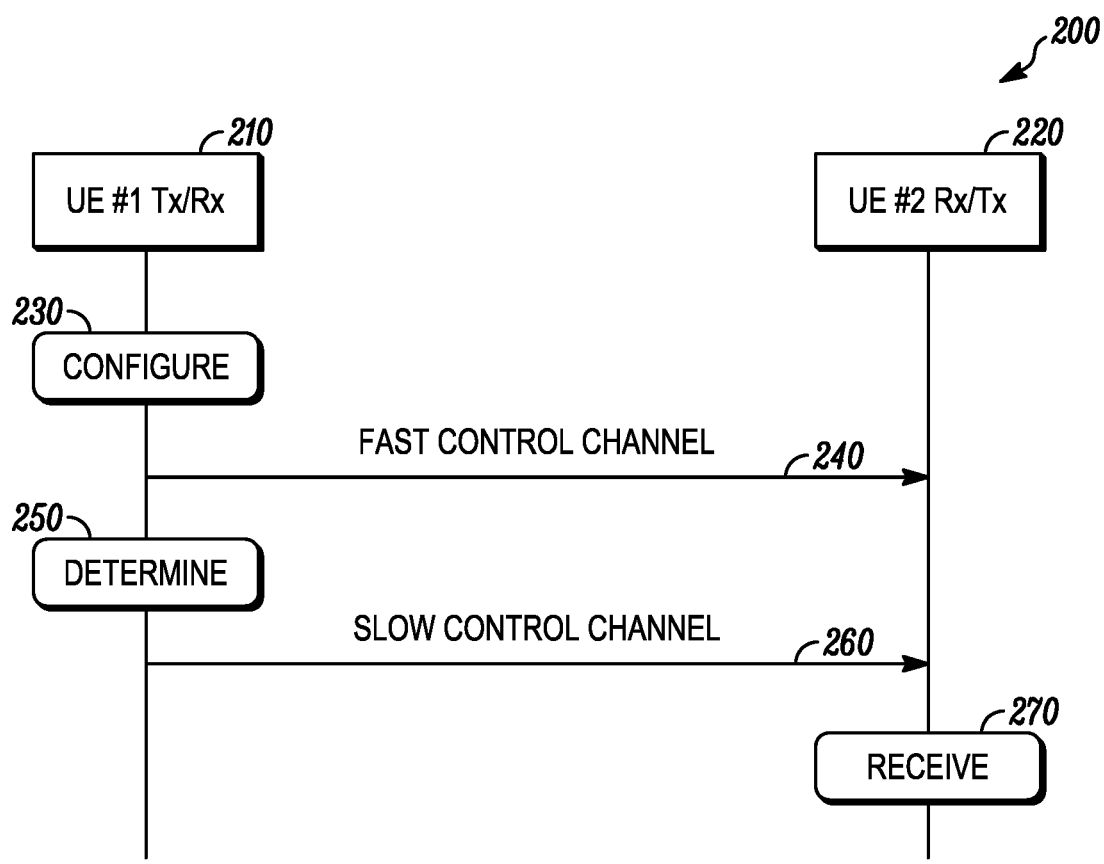
FIG. 2 is an example component illustration of two stage SCI according to a possible embodiment.

FIG. 2 is an example component illustration 200 of two stage SCI according to a possible embodiment. The illustration 200 can show the communication between a first transmitting UE 210 and a second receiving UE 220. At 230 and 250, the transmitting UE 210 can respectively configure and determine the SCI content of each stage, which can include SCI format and/or SCI size of the second stage SCI, aggregation level of the second stage SCI, and/or the transmission periodicity of the second stage SCI. The terms configure and determine can be considered synonymous. At 240, the transmitting UE 210 can transmit a fast control channel including the first stage SCI to the receiving UE 220. At 260, the transmitting UE 210 can transmit the slow control channel including the second stage SCI to the receiving UE 220. At 270, the receiving UE can receive the control channels, other control information, and/or data.

The configurations of the SCI can be addressed in different stages, where the content of the first stage can include the parameters that are directly or indirectly related to the sensing procedure and the fast-varying component of the SCI, which can mean a frequently changing parameter of the SCI. The word frequent can imply that these parameters can be transmitted in all the time slots along with every scheduled sidelink data packet in a PSSCH, such as the minimum parameter set of the SCI that can be signaled each time a PSSCH is scheduled. The fast PSCCH can also be referred to in one or more ways as fast PSCCH, fast sidelink control information, and/or fast sidelink control channel.

First stage SCI content can be a fixed size to keep the blind decoding complexity low. For example, when the second stage is not being transmitted, an explicit indicator can inform its presence or absence, otherwise the Time/Frequency (T/F) resource of the second stage SCI bits can be reserved or set to dummy values or an invalid Resource Block (RB) assignment, such as all ones set for all frequencies. In a possible example, when the second stage SCI is transmitted on a portion of the T/F resources of the PSSCH, such portion of the T/F resources can be reused for data transmission when the first stage SCI indicates the absence of the presence of the second stage SCI or the modification period timer has not expired.

In another possible embodiment, instead of an extra indicator to denote the presence or absence of second stage SCI where the extra indicator can be one of the reserved bits in the first stage SCI field, an invalid value of any first stage SCI field(s) can be used to indicate the absence of second stage SCI. For example, an invalid RB assignment for the second stage control channel resource can imply the absence of second stage SCI transmission.

In a method of a possible embodiment, the configuration of the first stage can also directly and indirectly addresses the configuration of the second stage in its SCI content. This configuration of the second stage can include the one or more of the following parameters related to the second stage: resource allocation of the second control channel, transmission periodicity, SCI format or SCI sizes, aggregation level, and/or other parameters.

Figure 3:
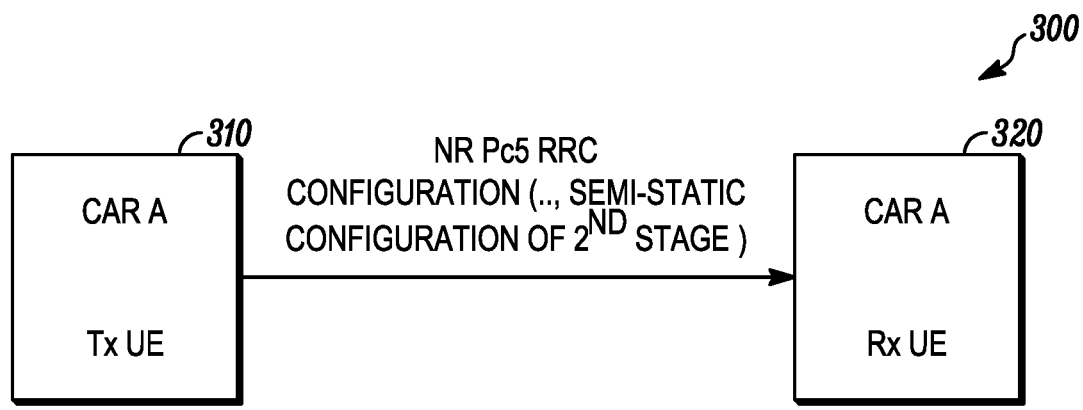
FIG. 3 is an example illustration of sidelink Radio Resource Control (RRC) configuration according to a possible embodiment.

FIG. 3 is an example illustration 300 of sidelink RRC configuration according to a possible embodiment. The illustration 300 can show NR Pc5 RRC configuration, such as semi-static configuration of the second stage SCI between a first car 310, such as a transmitting UE, and a second car 320, such as a receiving UE. This can further show Pc5 RRC connection during UC connection establishment. At least for the UC transmission, the configuration of the second stage SCI can be semi-statically configured, which can include the Control Resource Set (CORESET) configuration, transmission periodicity, SCI formats, SCI sizes, candidates, and other configuration, using a NR-Pc5 RRC message, L2 sidelink Medium Access Control (MAC) Control Element (CE), and/or using other message(s).

The configuration of the second stage can include the parameters that are directly or indirectly slow varying components of the SCI and related to the data decoding of PSSCH. The parameters can include Modulation and Coding Scheme (MCS), Transmit Power Control (TPC) command, Sidelink-Channel State Information (S-CSI) request, Codebook Block Group (CBG) transmission information, CBG flushing information, Demodulation Reference Signal (DMRS) Sequence Initialization, source identifier, beam/Transmission Configuration Indicator (TCI) state, spatial relation for S-CSI, and/or other information.

The word slow can imply that these parameters need not be transmitted in all the time slots along with every scheduled sidelink data packet in PSSCH. For example, remaining parameter sets other than the minimum parameter set may be signaled less often than at every PSSCH scheduling occasion.

Figure 4:
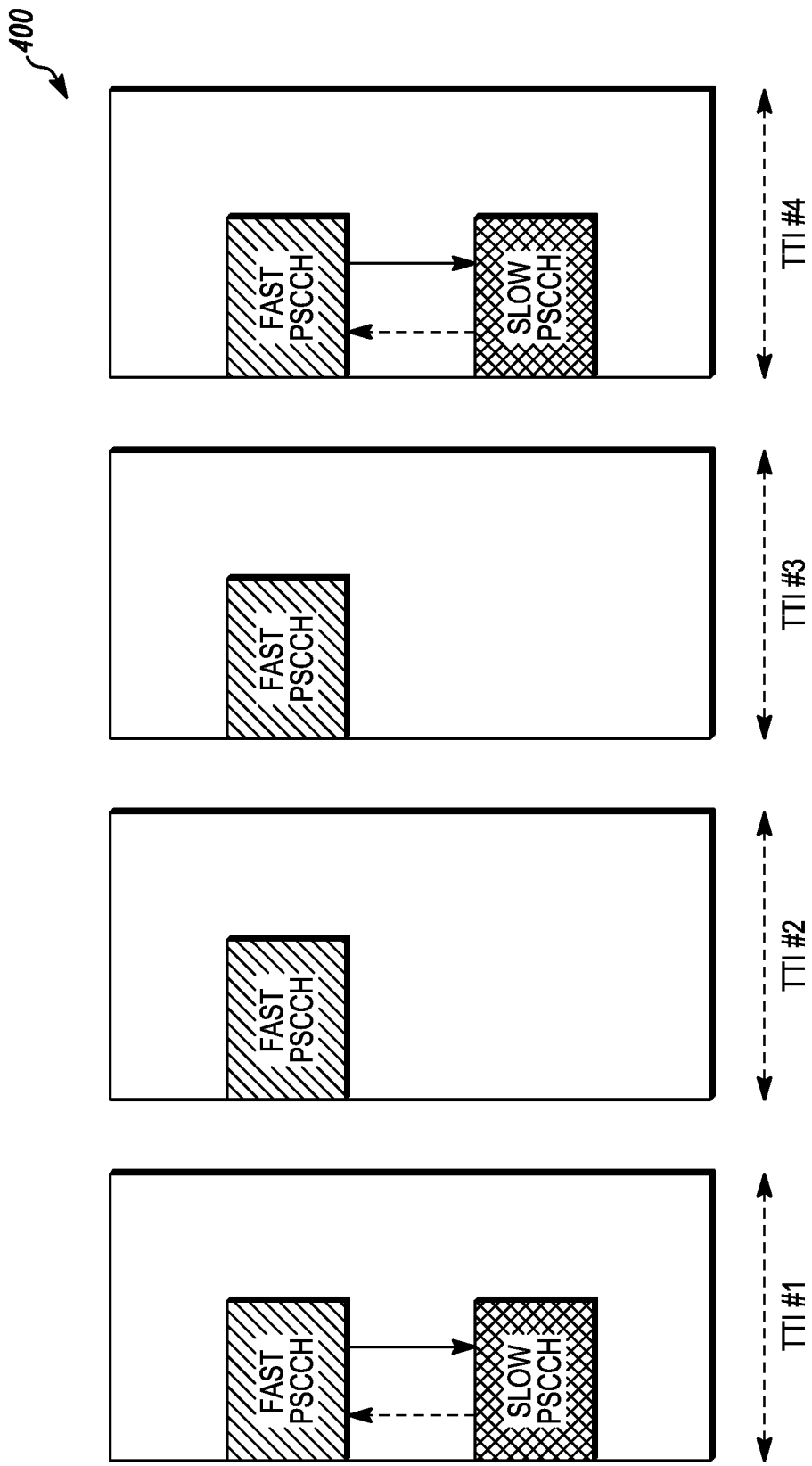
FIG. 4 is an example illustration of two stage SCI with scheduling in the same Transmit Time Interval (TTI) according to a possible embodiment.

FIG. 4 is an example illustration 400 of two stage SCI with scheduling in the same TTI according to a possible embodiment. The illustration 400 can include TTIs 1-3, with TTIs 1 and 2 including fast PSCCH and slow PSCCH and TTIs 2 and 3 including fast PSCCH.

Figure 5:
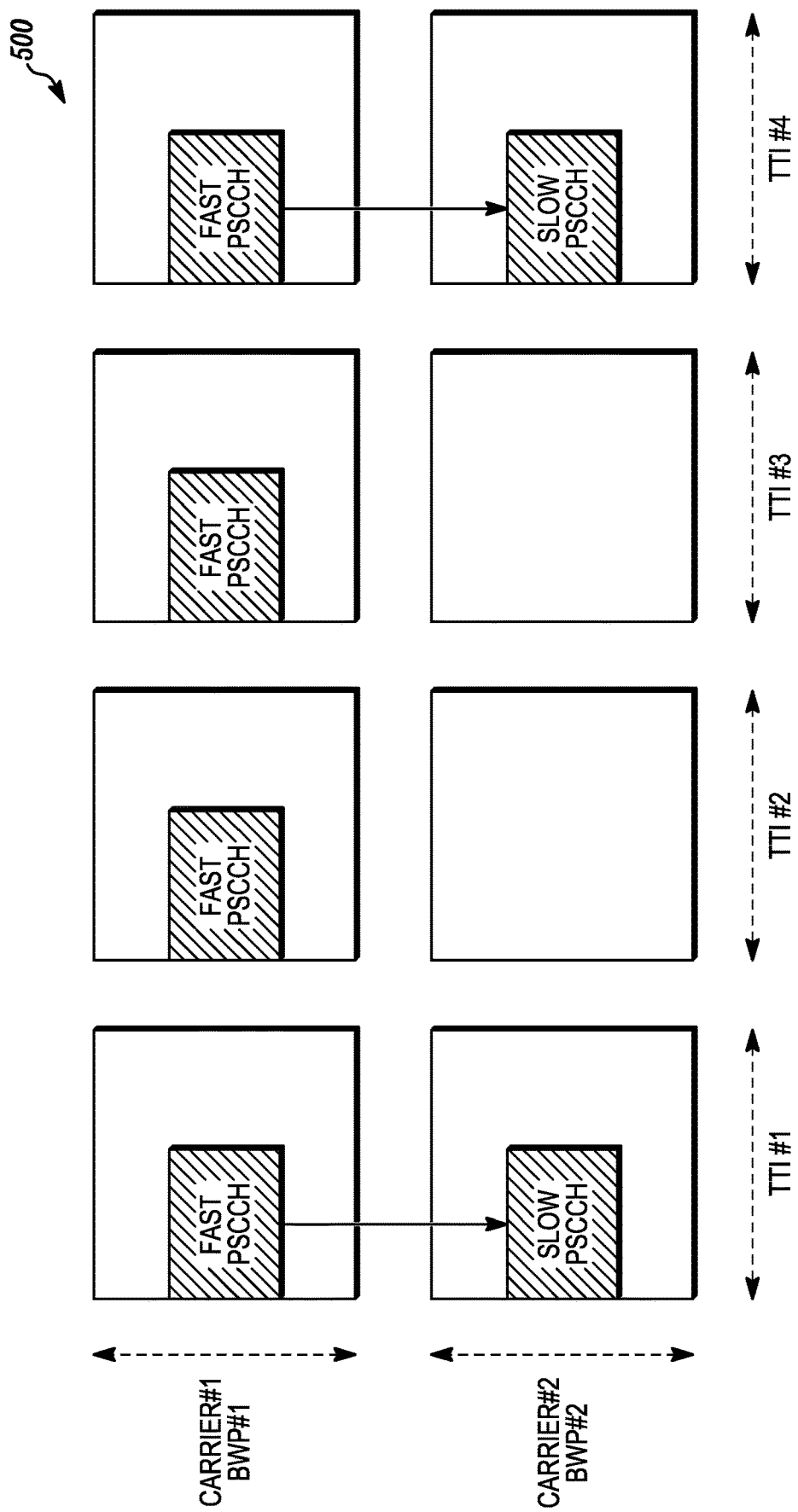
FIG. 5 is an example illustration of two stage SCI with scheduling in different Bandwidth Parts (BWPs) according to a possible embodiment.

FIG. 5 is an example illustration 500 of two stage SCI with scheduling in different BWPs according to a possible embodiment. The illustration 500 can include different carriers 1 and with different respective BWPs 1 and 2, as well as TTIs 1-4. TTIs 1 and 4 can include fast PSCCH on carrier 1 and BWP 1 and slow PSCCH on carrier 2 and BWP 2. TTIs 2 and 3 can include fast PSCCH on carrier 1 and BWP 1.

Figure 6:
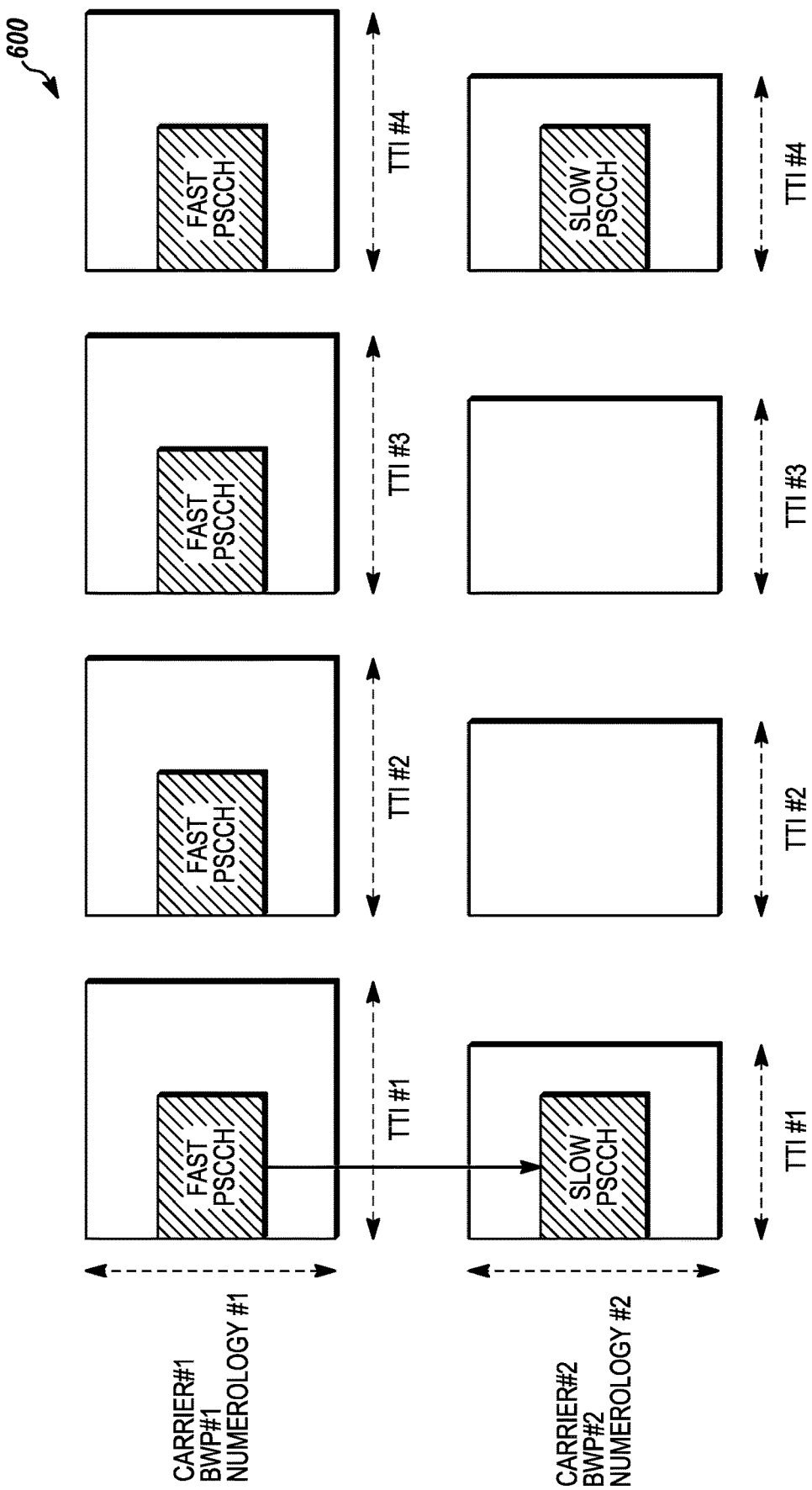
FIG. 6 is an example illustration of two stage SCI with scheduling in different numerology according to a possible embodiment.

FIG. 6 is an example illustration 600 of two stage SCI with scheduling in different numerology according to a possible embodiment. In the illustration 600, TTIs 1-4 on carrier 1 with BWP 1 and numerology 1 can include fast PSCCH and TTIs 1 and 4 on carrier 2 with BWP 2 and numerology 2 can include slow PSCCH. As shown in the illustrations 400, 500, and 600, the second stage SCI can be scheduled in the same BWP with the same or next time slot as that of the first stage SCI or can be scheduled in different BWPs with the same or different numerology.

First stage SCI content can be a fixed size to keep the blind decoding complexity low. When the second stage is not being transmitted, an explicit indicator can inform its presence or absence, otherwise the T/F resource of the second stage SCI bits can be reserved or set to dummy value or invalid RB assignments, such as all ones or all frequencies. In a possible example, when the second stage SCI is transmitted on a portion of the T/F resources of the PSSCH, such portion of the T/F resources can be reused for data transmission when the first stage SCI indicates absence of the presence of the second stage SCI or the modification period timer has not expired.

According to another possible embodiment, the destination ID may all ones to represent BC transmission.

Figure 7:
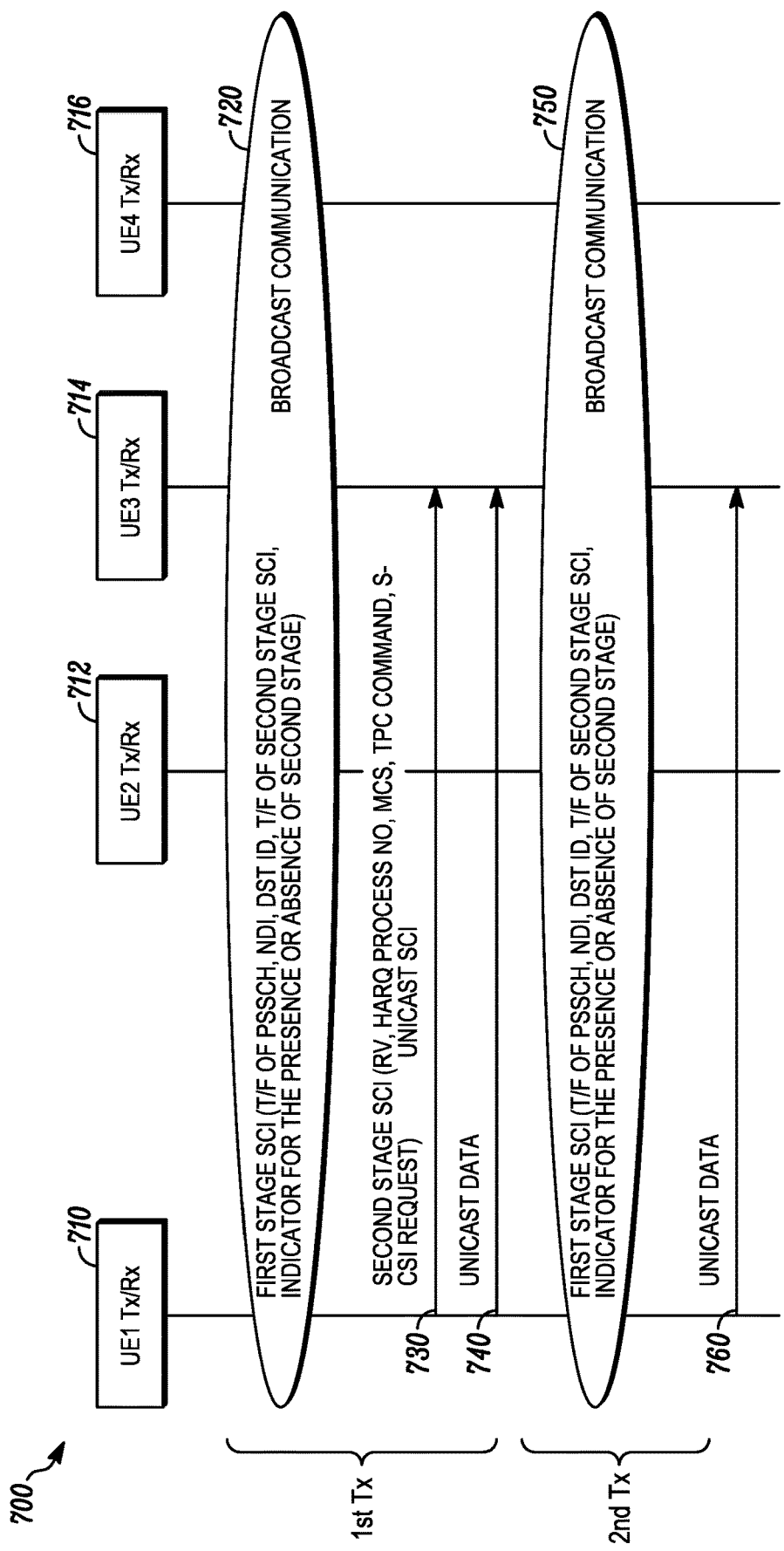
FIG. 7 is an example illustration of two stage SCI where the first stage indicates the presence or absence of the second stage according to a possible embodiment.

FIG. 7 is an example illustration 700 of two stage SCI where the first stage indicates the presence of the second stage according to a possible embodiment. The illustration 700 can show communication between a transmitting first UE 710 and multiple receiving UEs including a second UE 712, a third UE 714, and a fourth UE 716. In a first transmission process, at 720, the first UE 710 can transmit a first stage SCI BC communication. The first stage SCI can include T/F of PSSCH, NDI, destination ID, T/F of second stage SCI, an indicator of the presence or absence of the second stage SCI, and/or other information. At 730, the first UE 720 can send a second stage SCI in a UC SCI transmission to the third UE 714. The second stage SCI can include RV, HARQ process number, MCS, TPC command, S-CSI request, and/or other information. At 740, the first UE 710 can transmit UC data to the third UE 714. In a second transmission process, at 750, the first UE 710 can transmit a first stage SCI BC communication. The first stage SCI can include T/F of PSSCH, NDI, destination ID, T/F of second stage SCI, an indicator of the presence or absence of the second stage SCI, and/or other information. At 760, the first UE 710 can transmit UC data to the third UE 714. According to this embodiment, an indication can be provided in the first stage SCI that indicates when the second stage SCI is being transmitted. The indication can further be a flag bit that can be a 0 or 1 to indicate the presence or absence of second stage SCI.

Figure 8:
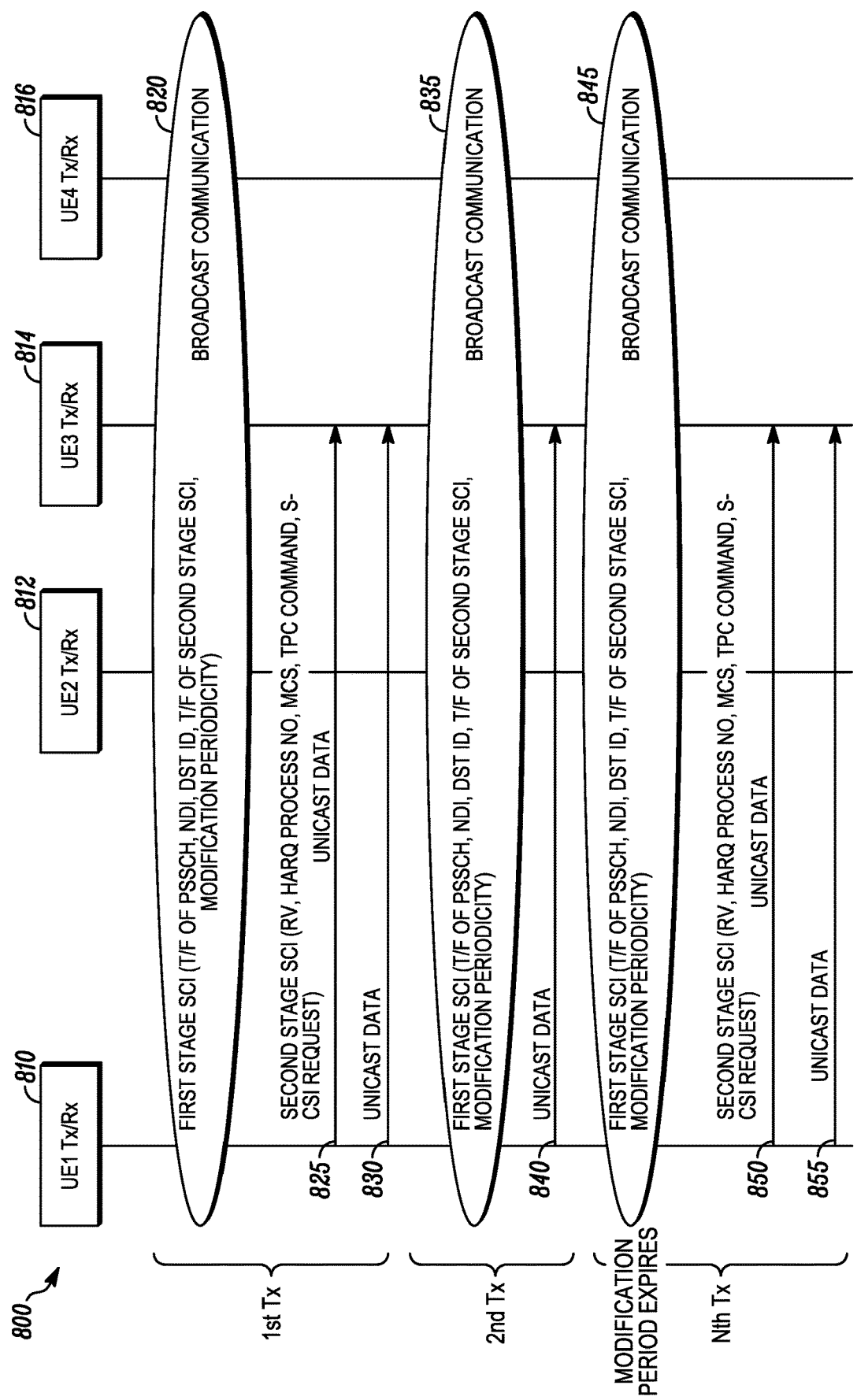
FIG. 8 is an example illustration of a transmitting UE in the first stage specifying the modification periodicity of the second stage SCI according to a possible embodiment.

FIG. 8 is an example illustration 800 of a transmitting UE in the first stage specifying the modification periodicity of the second stage SCI according to a possible embodiment. The illustration 800 can show communication between a transmitting first UE 810 and multiple receiving UEs including a second UE 812, a third UE 814, and a fourth UE 816. In a first transmission process, at 820, the first UE 810 can transmit a first stage SCI BC communication. The first stage SCI can include T/F of PSSCH, NDI, destination ID, T/F of second stage SCI, a modification periodicity, and/or other information. At 825, the first UE 820 can send a second stage SCI in a UC SCI transmission to the third UE 814. The second stage SCI can include RV, HARQ process number, MCS, TPC command, S-CSI request, and/or other information. At 830, the first UE 810 can transmit UC data to the third UE 814. In a second transmission process, at 835, the first UE 810 can transmit a first stage SCI BC communication. The first stage SCI can include T/F of PSSCH, NDI, destination ID, T/F of second stage SCI, a modification periodicity, and/or other information. At 840, the first UE 810 can transmit UC data to the third UE 814. In an $n^{th}$ transmission process, after the modification period expires, at 845, the first UE 810 can transmit a first stage SCI BC communication. The first stage SCI can include T/F of PSSCH, NDI, destination ID, T/F of second stage SCI, a modification periodicity, and/or other information. At 850, the first UE 820 can send a second stage SCI in a UC SCI transmission to the third UE 814. The second stage SCI can include RV, HARQ process number, MCS, TPC command, S-CSI request, and/or other information. At 855, the first UE 810 can transmit UC data to the third UE 814. According to this embodiment, a modification periodicity can be transmitted in the first stage SCI. In another related embodiment, the modification periodicity can be semi statically configured with L3 or L2 signaling options like NR Pc5 RRC or sidelink MAC CE as shown in the illustrations 300 and 800. A bit map field containing modification periodicity can include a time slot index, a periodicity, and/or other information.

Additionally, when a slow PSCCH, such as the second stage, is not present in a given time slot, a receiving UE can utilize the grant from a previously most recently received and/or decoded PSCCH. In other words, when the second stage SCI is not being transmitted, then the UE can assume that the content of the second stage remains same until the next modification period or until the next timer expiry.

Figure 9:
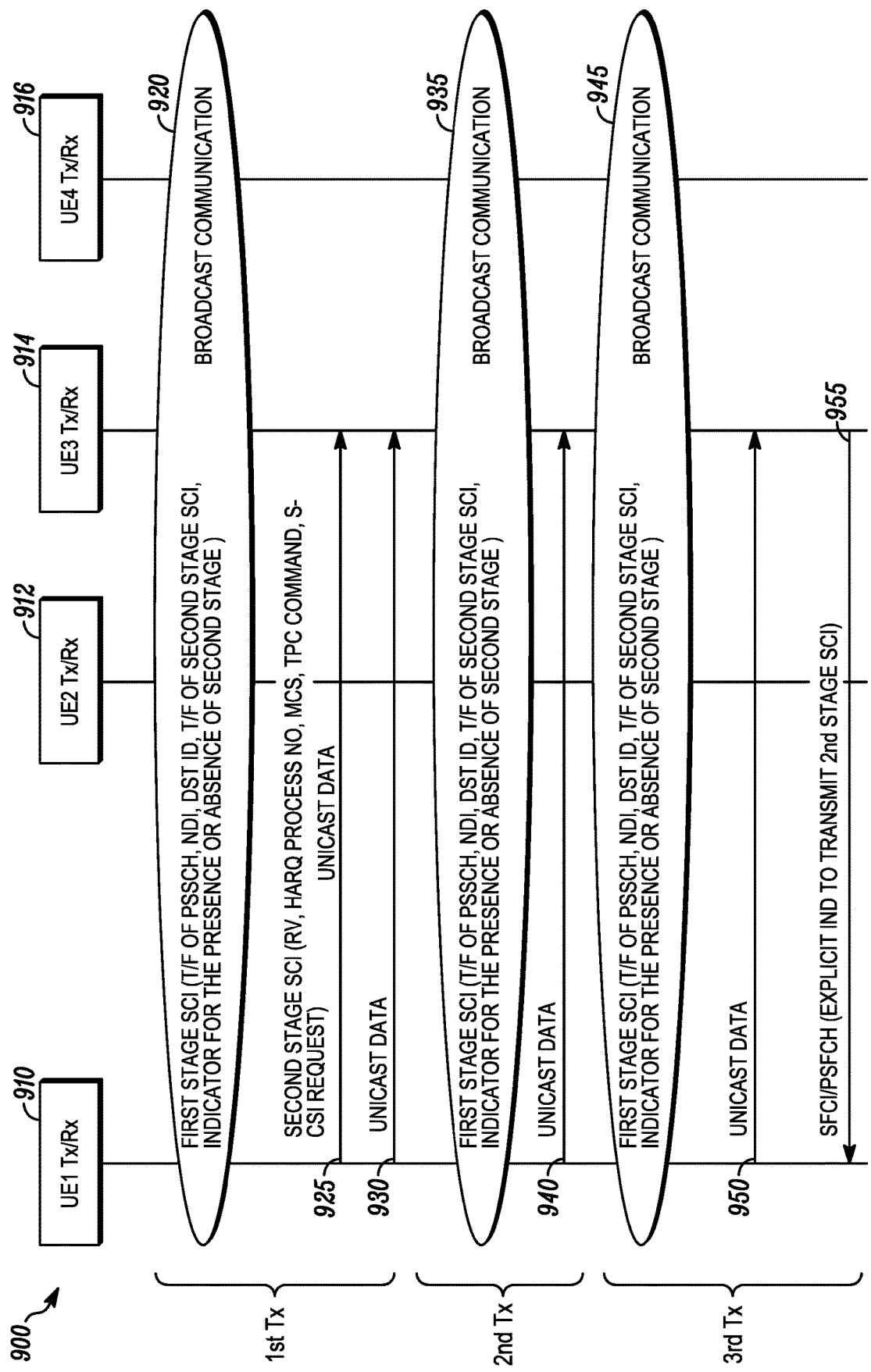
FIG. 9 is an example illustration of a receiving UE explicitly requesting a transmitting UE to send the second stage SCI according to a possible embodiment.

FIG. 9 is an example illustration 900 of a receiving UE explicitly requesting a transmitting UE to send the second stage SCI according to a possible embodiment. The illustration 900 can show communication between a transmitting first UE 910 and multiple receiving UEs including a second UE 912, a third UE 914, and a fourth UE 916. In a first transmission process, at 920, the first UE 910 can transmit a first stage SCI BC communication. The first stage SCI can include T/F of PSSCH, NDI, destination ID, T/F of second stage SCI, an indicator of the presence or absence of the second stage SCI, and/or other information. At 925, the first UE 920 can send a second stage SCI in a UC SCI transmission to the third UE 914. The second stage SCI can include RV, HARQ process number, MCS, TPC command, S-CSI request, and/or other information. At 930, the first UE 910 can transmit UC data to the third UE 914. In a second transmission process, at 935, the first UE 910 can transmit a first stage SCI BC communication. The first stage SCI can include T/F of PSSCH, NDI, destination ID, T/F of second stage SCI, an indicator of the presence or absence of the second stage SCI, and/or other information. At 940, the first UE 910 can transmit UC data to the third UE 914. In a third transmission process, at 945, the first UE 910 can transmit a first stage SCI BC communication. The first stage SCI can include T/F of PSSCH, NDI, destination ID, T/F of second stage SCI, an indicator of the presence or absence of the second stage SCI, and/or other information. At 950, the first UE 910 can transmit UC data to the third UE 914. At 955, the third UE 914 can send Sidelink Feedback Control Information (SFCI)/Physical Sidelink Feedback Channel (PSFCH) including an explicit indication to transmit the second stage SCI. For example, the receiving third UE 914 can explicitly ask the transmitting UE 910 in Layer 1 (L1) or Layer 2 (L2) signaling, such as in L1 SFCI, such as via a PSFCH, or in a SL MAC CE, to transmit the second stage with updated scheduling information in the second stage.

According to another possible embodiment, based on the received CSI from a receiving UE, a transmitting UE can update the scheduling information, such as MCS, precoder, beam/TCI-state, and other information, and transmit the second stage with an updated scheduling information in the second stage SCI. According to another possible embodiment, the modification period timer can be (re)-started when the receiving UE receives an indication of the second stage SCI. The indication of the presence of the second stage SCI can be sent in the first stage SCI or implicitly assumed based on the valid/invalid RB assignment field indicated in the first stage SCI.

According to another possible embodiment, the receiving UE may not be expected to decode the Transport Block (TB) of PSSCH if the first stage SCI indicates the presence of second stage SCI, but the UE fails to decode the second stage SCI. In this case, the UE may not be expected to decode the transport TB of PSSCH and can send a NACK on a common feedback resource or explicit feedback indicator on a dedicated feedback resource in SFCI, such as on a feedback channel, to request the transmission of second stage SCI again. The UE also may not be expected to apply previously decoded configuration of second stage SCI to decode the TB of PSSCH. Applying wrong second stage SCI for data decoding can result in soft buffer corruption. Hence, to avoid the soft buffer corruption, the UE procedure can include to not decode the PSSCH for a data packet where the receiving UE fails to decode second stage SCI.

According to another possible embodiment, the second stage SCI may be present even if the first stage SCI indicates absence of the presence of the second stage SCI or the modification period timer has not expired. This may be for the case of BC or GC transmission. A UE may not be expected to decode the second stage SCI for a TB if the first stage SCI indicates absence of the presence of the second stage SCI or the modification period timer has not expired, and the UE has previously received the second stage SCI for the same TB, such as at the start of the modification period or when a new TB is scheduled.

If the first stage SCI indicates absence of the second stage SCI or the modification period timer has not expired, the receiving UE can assume that the current PSSCH transmission is a retransmission of a TB corresponding to the most recently received second stage SCI. The retransmission may be with the same MCS and RV as that indicated in the second stage SCI. In one example, the RV sequence may be pre-determined. In another example, in case of accumulated TPC, the TPC command can be applied only once on reception of the second stage SCI. The TPC command may not be re-applied, such as the TPC loop may not be updated with the value of the TPC command, when the second stage SCI is not present. In another example, in case of absolute TPC, the TPC command from the previously received second stage SCI can be applied to the data transmission even when the second stage SCI is not present for the current transmission. Similarly, the S-CSI request can only be considered to be triggered when the second stage SCI is received, and considered not triggered when the when the second stage SCI is not present.

In GC transmission, such as group communication, for NR V2x, there can be two methods of group formation. In one method a group can be formed semi statically by the V2x application layer where the group ID is communicated to the Radio Access Network (RAN). In another method group can be dynamically created with input parameters, such as communication range.

In cases where a UE can join a group at any time it may happen that a UE cannot obtain the second stage SCI when it joins the group. The UE may not decode the PSSCH until it receives and correctly decodes the second stage SCI and the procedure can be same as explained in previous embodiments. If the new UE is a new part of the group, then it can ignore the occupied PSSCH resources for resource selection and it can ignore decoding the PSSCH.

Figure 10:
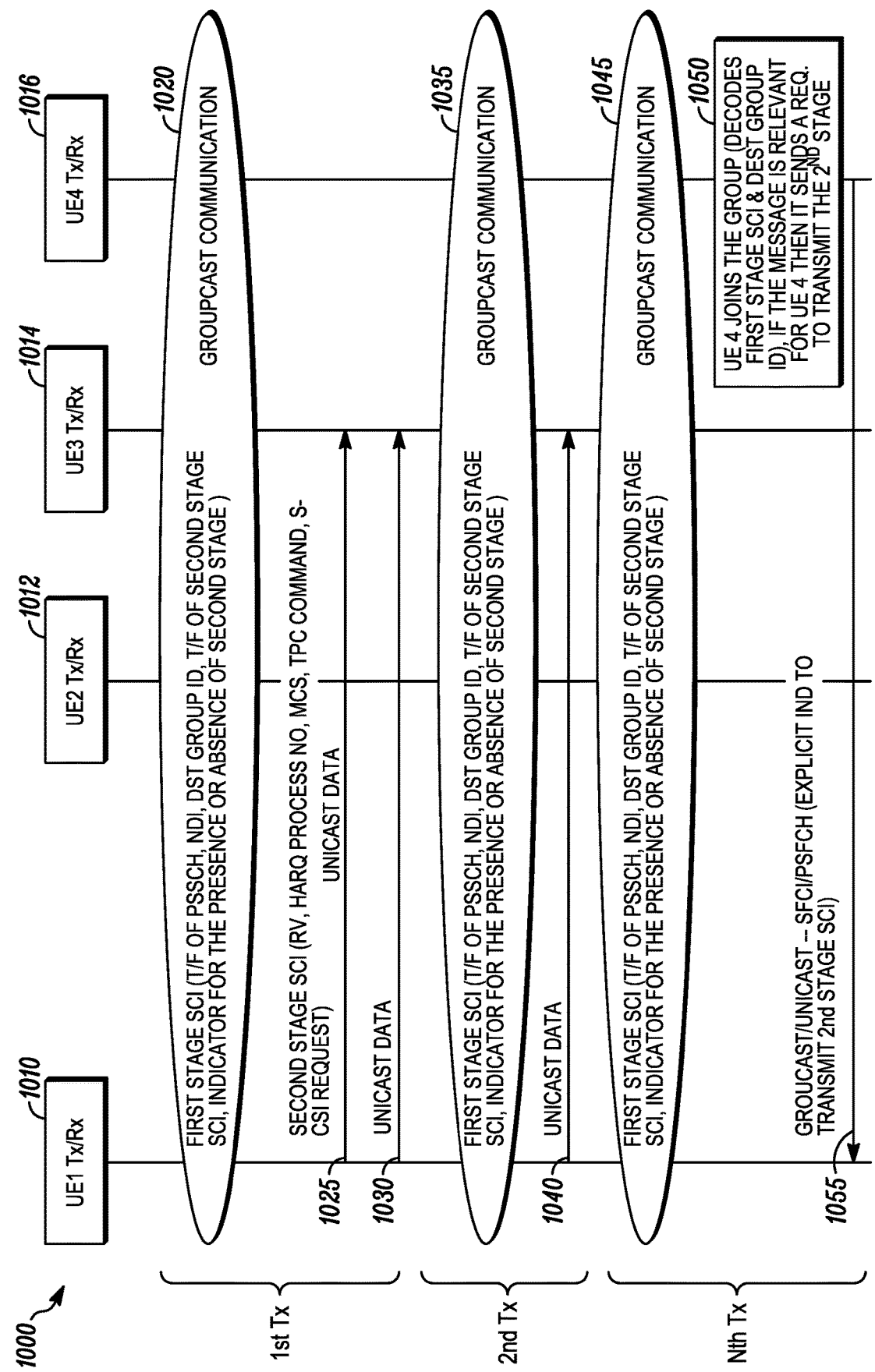
FIG. 10 is an example illustration of a UE joining a group using groupcast transmission according to a possible embodiment.

FIG. 10 is an example signal flow diagram 1000 of a UE joining a group using GC transmission according to a possible embodiment. The group can include a transmitting first UE 1010 and multiple receiving UEs including a second UE 1012, a third UE 1014, and a new fourth UE 1016. At 1020, in a first transmission process, the UE 1010 can GC communicate the first stage SCI including the T/F of PDSSCH, NDI, destination group ID, the T/F of the second stage SCI, an indicator that indicates the presence or absence of the second stage, and/or other information. At 1025, the UE 1010 can transmit the second stage SCI including the RV, the HARQ process number, the MCS, the TPC command, the S-CSI request, and other information. At 1030, the UE 1010 can transmit UC data to the UE 1014. At 1035, in a second transmission process, the UE 1010 can GC communicate the first stage SCI including the T/F of PDSSCH, NDI, destination group ID, the T/F of the second stage SCI, an indicator that indicates the presence or absence of the second stage, and/or other information. At 1040, the UE 1010 can transmit UC data to the UE 1014. At 1045, in an $n^{th}$ transmission process, the UE 1010 can GC communicate the first stage SCI including the T/F of PDSSCH, NDI, destination group ID, the T/F of the second stage SCI, an indicator that indicates the presence or absence of the second stage, and/or other information. At 1050, the UE 1016 can join the group by decoding the first stage SCI and destination group ID. If the first stage SCI message is relevant to the UE 1016, then at 1055, the UE 1016 can send a GC or UC SFCI/PSFCH including an explicit indication to request transmission of the second stage SCI.

For example, the new UE 1016 can decode the first stage SCI as part of the sensing procedure at every possible time slot. From the configured Layer 2 destination ID or Layer 2 destination group ID/Layer 1 destination group ID, the new UE 1016 can know whether it is part of the group and whether it should decode group cast transmission of PSSCH. If the new UE 1016 needs to decode the PSSCH transmission, then the new UE 1016 can transmit a GC transmission to the destination group ID to announce its presence in the group with its own source ID/UE ID. Alternately, if the new UE 1016 knows the source ID of the transmitting UE 1010 from the first stage, then it can request the transmission of second stage SCI.

Figure 11:
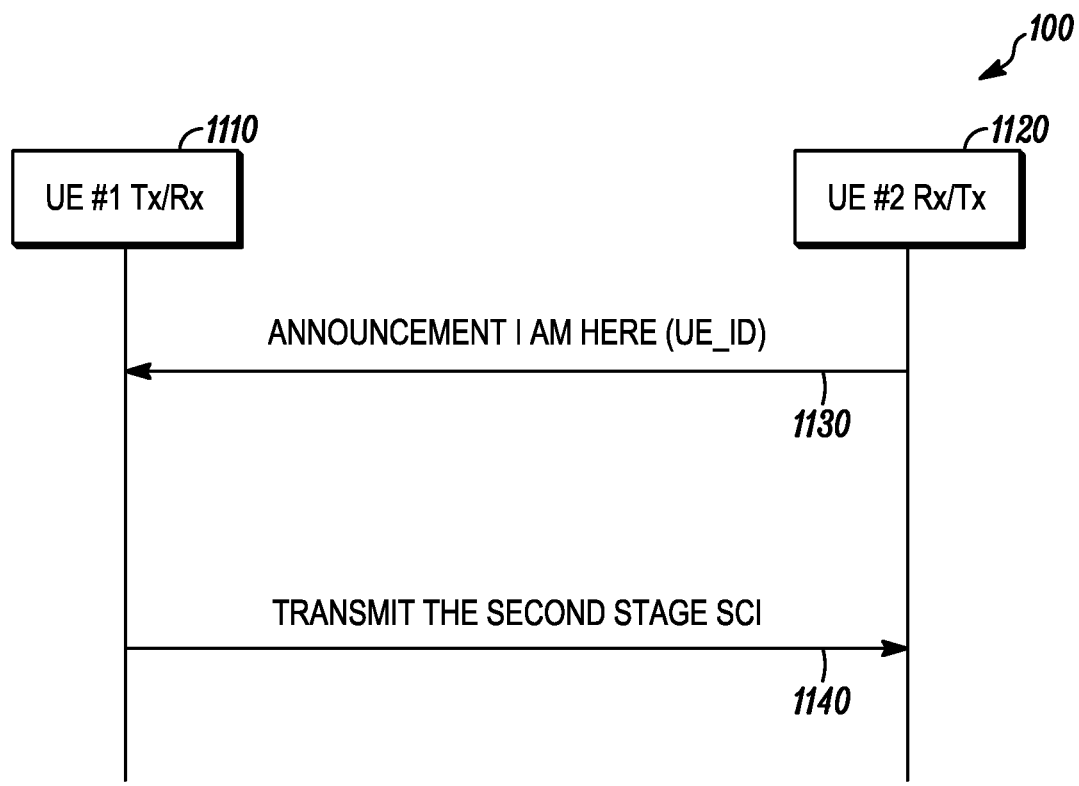
FIG. 11 is an example illustration of a new UE announcing itself to a group according to a possible embodiment.

FIG. 11 is an example illustration 1100 of a new UE announcing itself to a group according to a possible embodiment. The illustration 1100 can show communication between a first UE 1110 and a second UE 1120. The UE 1120 can be new to a group. At 1130, the new UE 1120 can send an announcement indicating that it is present. The announcement can include an identifier of the new UE 1120. For example, the new UE 1120 can announce itself to the group with its identifier, which can be a SCI transmission or any other physical layer discovery mechanism. At 1140, the UE 1110 can transmit the second stage SCI to the new UE 1120.

Figure 12:
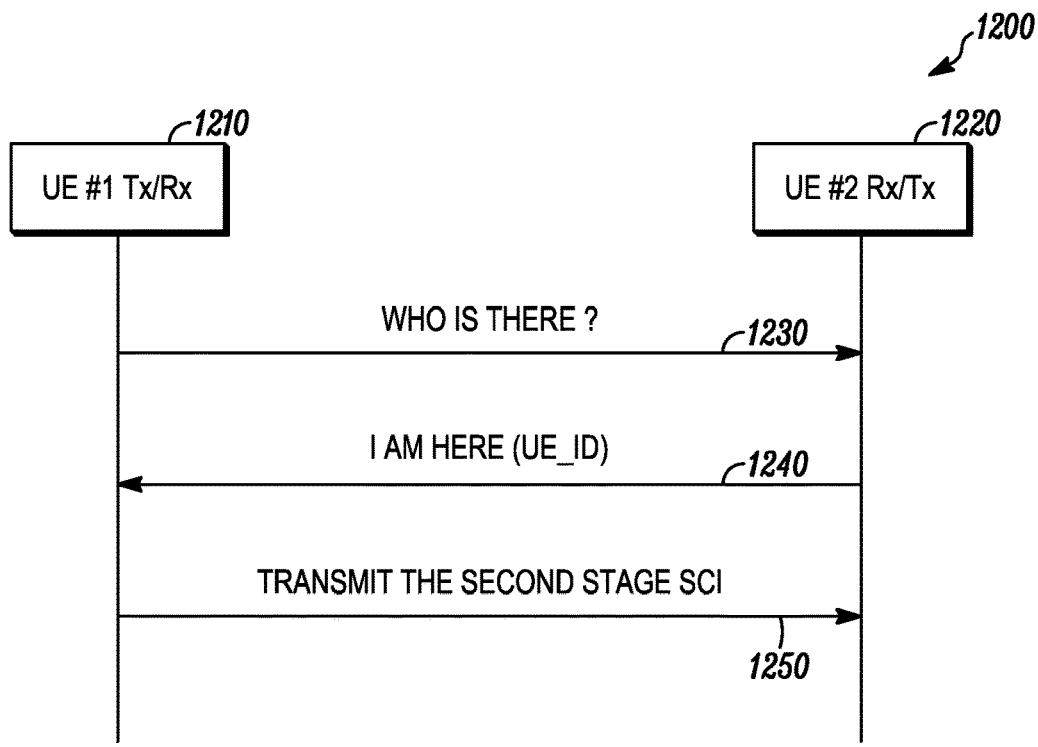
FIG. 12 is an example illustration of discovery and second stage SCI transmission for a group according to a possible embodiment.

FIG. 12 is an example illustration 1200 of discovery and second stage SCI transmission for a group according to a possible embodiment. The illustration 1200 can show communication between a first UE 1210 and a second UE 1220. At 1230, the UE 1210 can send an inquiry about what other UEs are available. At 1240, the UE 1220 can indicate that it is present and can send its UE identifier. At 1240, the UE 1210 can transmit the second stage SCI. For example, for GC transmission, the second stage SCI can be transmitted to the newly joined UE 1220 in the group after the discovery procedure.

Figure 13:
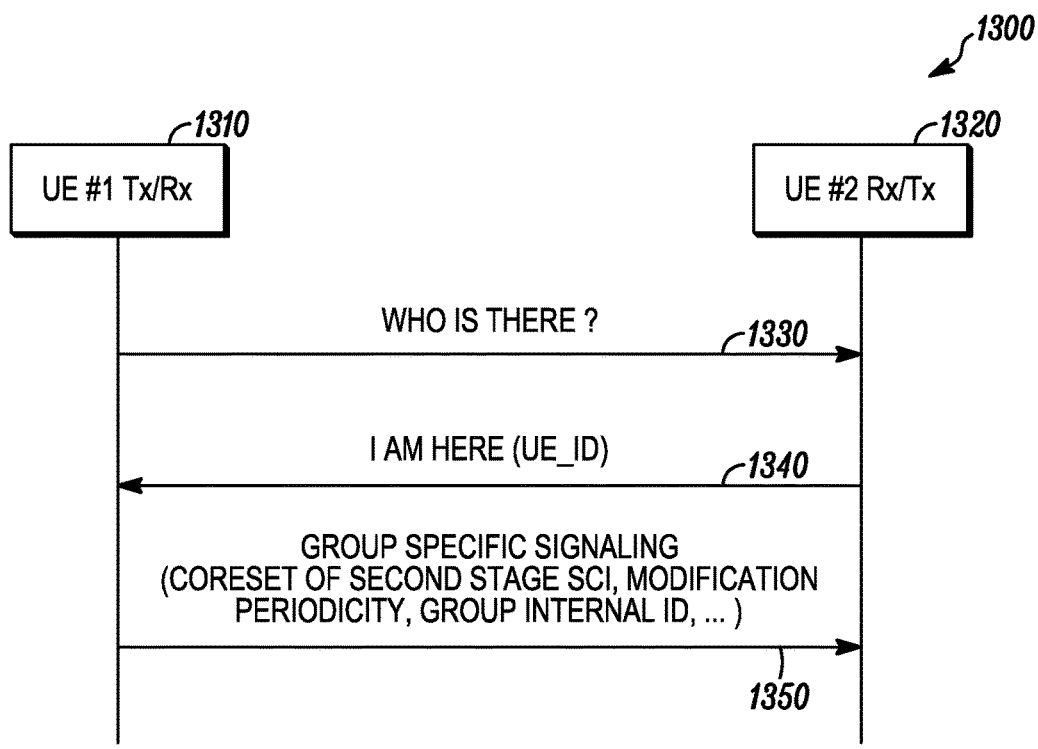
FIG. 13 is an example illustration of group specific signaling according to a possible embodiment.

FIG. 13 is an example illustration 1300 of group specific signaling according to a possible embodiment. The illustration 1300 can show communication between a first UE 1310 and a second UE 1320 that is new to a group. At 1330, the UE 1310 can send an inquiry about what other UEs are available. At 1340, the UE 1320 can indicate that it is present and send its UE identifier. At 1350, the UE 1310 can send group specific signaling including a CORESET of the second stage SCI, modification periodicity, a group internal identifier, and other information. For example, the group specific signaling can be transmitted to the newly joined UE 1320 after a discovery procedure. The group specific signaling can contain details about the CORESET configuration of the second stage SCI for the UEs part of the group, can contain modification periodicity, and can contain other information.

The modification timer can be (re)started again in any of the previous embodiments when the transmitting UE schedules the second stage SCI before its expiry.

Figure 14:
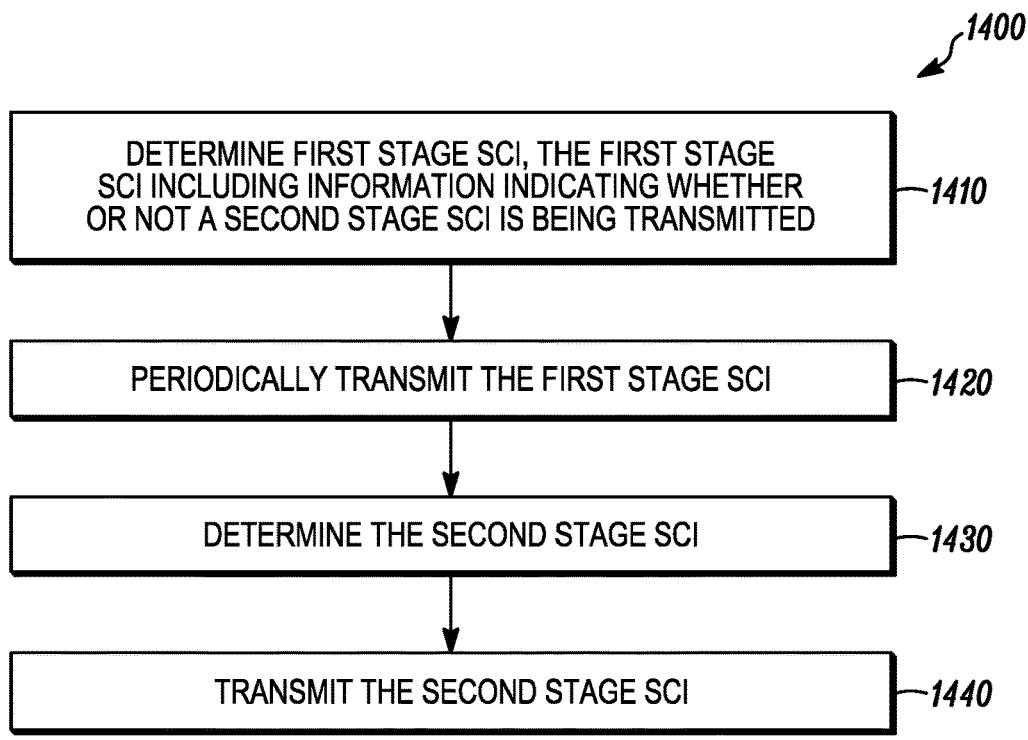
FIG. 14 is an example flowchart outlining the operation of a wireless communication device according to a possible embodiment.

FIG. 14 is an example flowchart 1400 outlining the operation of a wireless communication device, such as the UE 110, according to a possible embodiment. At 1410, first stage SCI can be determined. The first stage SCI can include information indicating whether or not a second stage SCI is being transmitted. The information in the first stage SCI can also include a presence indicator bit that indicates whether or not the second stage SCI is being transmitted and/or whether or not the second stage SCI should be decoded by at least one receiving UE. The information in the first stage SCI can also include an invalid resource assignment. The invalid resource assignment can indicate the second stage SCI is not being transmitted. For example, an invalid RB assignment for a second stage control channel resource can imply the absence of second stage SCI transmission. As a further example, an invalid value of at least one field in the first stage SCI field can indicate the absence of second stage SCI. The information in the first stage SCI can also indicate the periodicity of the second stage SCI.

At 1420, the first stage SCI can be periodically transmitted. Periodically transmitting the first stage SCI can include transmitting the first stage SCI in every sidelink time slot including a scheduled sidelink data packet in a PSSCH. For example, first stage SCI can be frequent, which can imply that these parameters can be transmitted in all time slots along with every scheduled sidelink data packet in PSSCH, such as the minimum parameter set of the SCI that can be signaled each time a PSSCH is scheduled.

At 1430, the second stage SCI can be determined. The second stage SCI can contain parameters for decoding data of a PSSCH. For example, the PSSCH decoding parameters can include MCS, TPC command, S-CSI request, CBG transmission information, CBG flushing information, DMRS Sequence Initialization, Source ID, beam/TCI state, spatial relation for S-CSI, and other information.

At 1440, the second stage SCI can be transmitted. The second stage SCI can be transmitted less often than the first stage SCI.

According to a possible embodiment, a NACK can be received in a sidelink feedback channel when a receiving device does not decode the second stage SCI. For example, if a receiving UE receives the first stage SCI, but determines that it did not decode the second stage SCI, the receiving UE can transmit a NACK. As a further example, the NACK can be transmitted when the first stage SCI indicates the presence of second stage SCI but the receiving UE fails to decode the second stage SCI.

According to another possible embodiment second stage SCI time-frequency resources can be reused for data transmission when the second stage SCI is not being transmitted on the second stage SCI time-frequency resources.

According to another possible embodiment, the second stage SCI can be a first second stage SCI. A request to transmit updated scheduling information can be received. Updated scheduling information can be transmitted in a second second stage SCI in response to receiving the request to transmit updated scheduling information.

According to another possible embodiment, the first stage SCI can include a modification period of the second stage SCI. Data can be transmitted on a PSSCH based on the second stage SCI until the modification period expires.

According to another possible embodiment, periodically transmitting the first stage SCI can include groupcasting the first stage SCI to a group of UEs. A communication can be received from a UE that is new to the group of UEs after transmitting the second stage SCI. The second stage SCI can be retransmitted in response to receiving the communication.

According to another possible embodiment, a determination can be made as to whether to transmit two-stage sidelink control information. The first stage sidelink control information can be determined in response to determining to transmit two-stage sidelink control information. Also, the second stage sidelink control information can be determined in response to determining to transmit two-stage sidelink control information.

Figure 15:
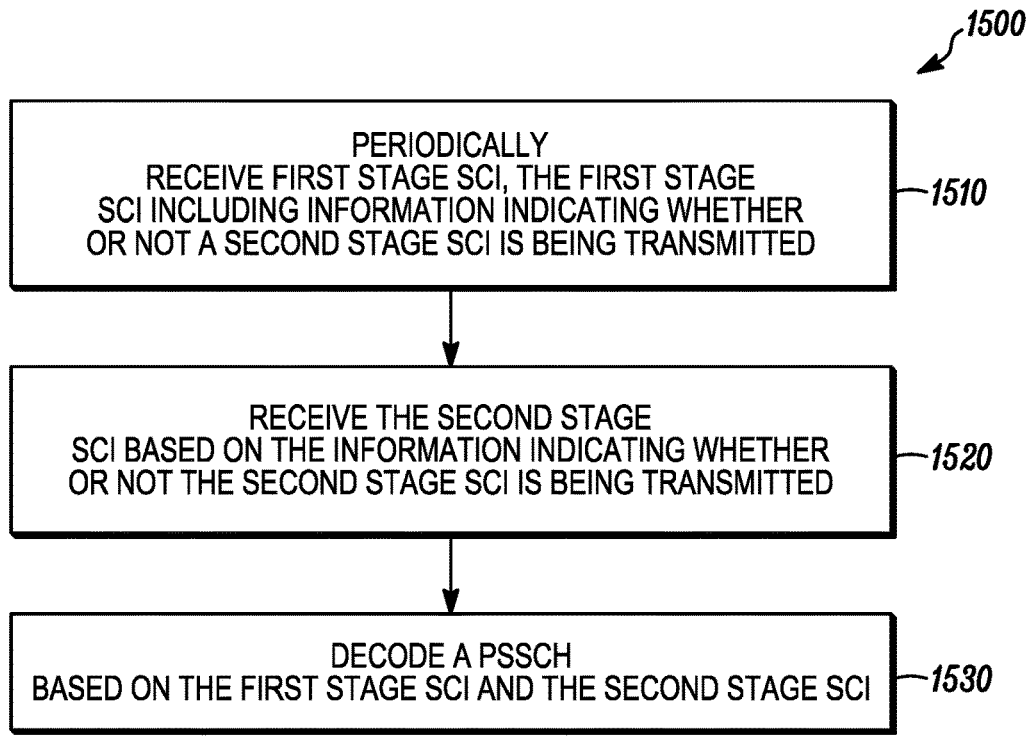
FIG. 15 is an example flowchart outlining operation of a wireless communication device according to a possible embodiment.

FIG. 15 is an example flowchart outlining operation of a wireless communication device, such as the UE 110, according to a possible embodiment. At 1510, first stage SCI can be periodically received. The first stage SCI can include information indicating whether or not a second stage SCI is being transmitted. The information of the first stage SCI can also indicate when the second stage SCI is being transmitted. At 1520, the second stage SCI can be received based on the information indicating whether or not the second stage SCI is being transmitted. At 1530, a PSSCH can be decoded based on the first stage SCI and the second stage SCI. According to possible embodiments, other disclosed reciprocal operations can be performed for responding to a transmitting UE's sidelink transmissions.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 16:
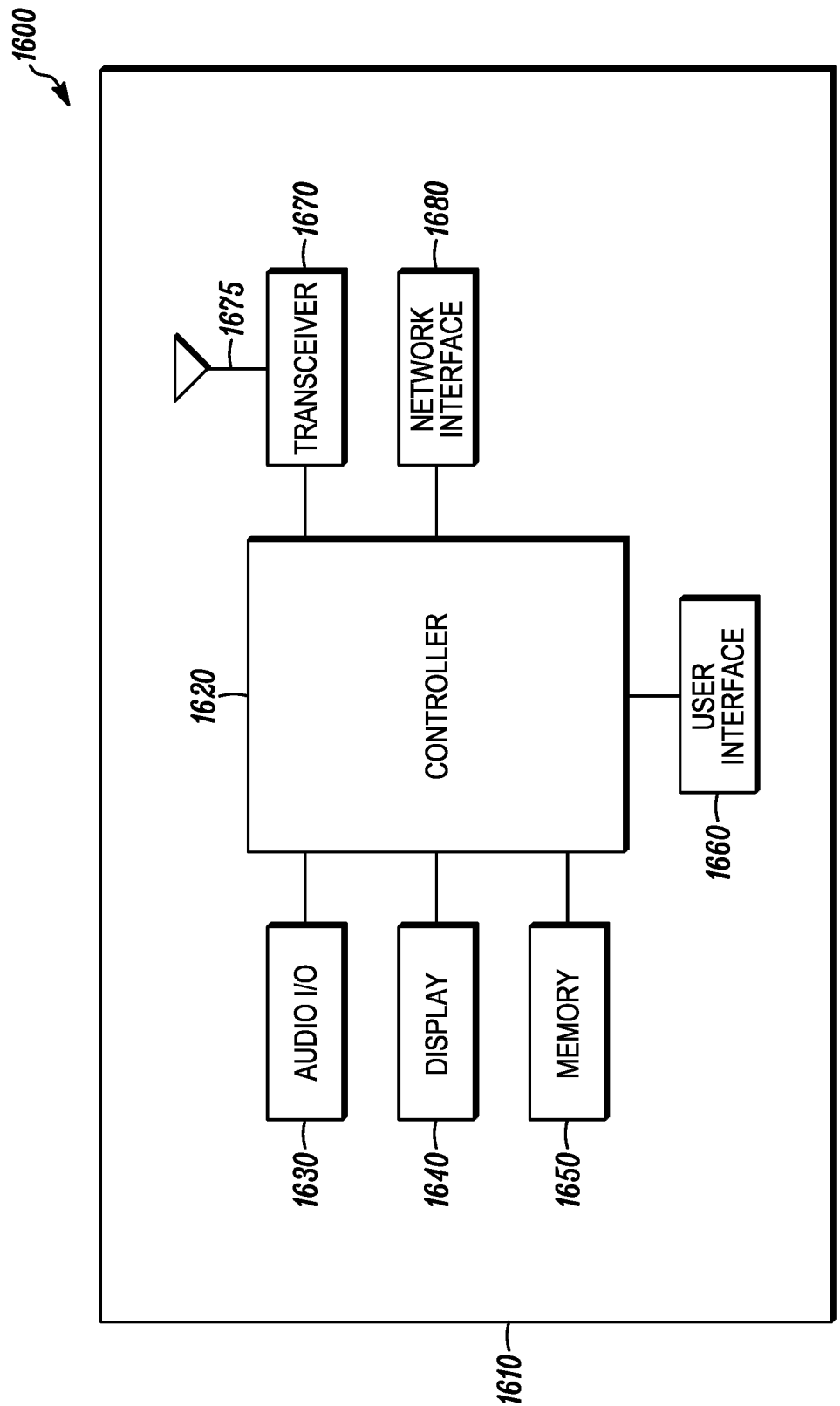
FIG. 16 is an example block diagram of an apparatus according to a possible embodiment.

FIG. 16 is an example block diagram of an apparatus 1600, such as the UE 110, the network entity 120, or any other wireless communication device disclosed herein, according to a possible embodiment. The apparatus 1600 can include a housing 1610, a controller 1620 coupled to the housing 1610, audio input and output circuitry 1630 coupled to the controller 1620, a display 1640 coupled to the controller 1620, a memory 1650 coupled to the controller 1620, a user interface 1660 coupled to the controller 1620, a transceiver 1670 coupled to the controller 1620, at least one antenna 1675 coupled to the transceiver 1670, and a network interface 1680 coupled to the controller 1620. The apparatus 1600 may not necessarily include all of the illustrated elements for different embodiments of the present disclosure. The apparatus 1600 can perform the methods described in all the embodiments.

The display 1640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1670 can be one or more transceivers that can include a transmitter and/or a receiver. The audio input and output circuitry 1630 can include a microphone, a speaker, a transducer, or any other audio input and output circuitry. The user interface 1660 can include a keypad, a keyboard, buttons, a touch pad, a joystick, a touch screen display, another additional display, or any other device useful for providing an interface between a user and an electronic device. The network interface 1680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1650 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 1600 or the controller 1620 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 1650, elsewhere on the apparatus 1600, in cloud storage, and/or anywhere else that can store software and/or an operating system. The apparatus 1600 or the controller 1620 may also use hardware to implement disclosed operations. For example, the controller 1620 may be any programmable processor. Furthermore, the controller 1620 may perform some or all of the disclosed operations. For example, at least some operations can be performed using cloud computing and the controller 1620 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1620 may be any controller or processor device or devices capable of operating an apparatus and implementing the disclosed embodiments. Some or all of the additional elements of the apparatus 1600 can also perform some or all of the operations of the disclosed embodiments.

In operation, the apparatus 1600 can perform the methods and operations of the disclosed embodiments. The transceiver 1670 can transmit and receive signals, including data signals and control signals that can include respective data and control information. The controller 1620 can generate and process the transmitted and received signals and information.

According to a possible embodiment, the controller 1620 can determine first stage SCI. The first stage SCI can include information indicating whether or not a second stage SCI is being transmitted. The information in the first stage SCI can indicate the periodicity of the second stage SCI. The information in the first stage SCI can also include a presence indicator bit that indicates whether or not the second stage SCI is being transmitted and/or whether or not the second stage SCI should be decoded by at least one receiving UE. The information in the first stage SCI can also include an invalid resource assignment. The invalid resource assignment can indicate the second stage SCI is not being transmitted. The transceiver 1670 can periodically transmit the first stage SCI. The controller 1620 can determine the second stage SCI. The transceiver 1670 can transmit the second stage SCI. The second stage SCI can be transmitted less often than the first stage SCI.

According to a possible embodiment, the transceiver 1670 can receive a NACK in a sidelink feedback channel when a receiving device does not decode the second stage SCI.

According to a possible embodiment, the controller 1620 can reuse time-frequency resources allocated for second stage SCI for data transmission when the second stage SCI is not being transmitted on the second stage SCI time-frequency resources.

According to a possible embodiment, the second stage SCI can be a first second stage SCI. The transceiver 1670 can receive a request to transmit updated scheduling information. The transceiver 1670 can transmit updated scheduling information in a second second stage SCI in response to receiving the request to transmit updated scheduling information.

According to a possible embodiment, the first stage SCI can include a modification period of the second stage SCI. The transceiver 1670 can transmit data on a PSSCH based on the second stage SCI until the modification period expires.

According to a possible embodiment, the transceiver 1670 can periodically transmit the first stage SCI by groupcasting the first stage SCI to a group of UEs. The transceiver 1670 can receive a communication from a UE that is new to the group of UEs after transmitting the second stage SCI. The transceiver 1670 can retransmit the second stage SCI in response to receiving the communication.

At least some embodiments can provide for optimization of two stage SCI where the first stage of the SCI can contain sensing related resource reservation information that aid anonymous UEs to find empty resources plus a fast-varying part of the SCI because first stage may need to be transmitted all the time. The second stage SCI can contain a slow varying part of the SCI, which need not be transmitted in all time slots.

An indication can be provided in the first stage that indicates when the second stage SCI will be transmitted. The indication can include modification periodicity, at least one bit, 0/1, to indicate the presence or absence of second stage, an implicit indication based on the invalid/valid RB assignment for the second stage SCI, and/or can include other information. When the second stage SCI is not being transmitted, then a receiving UE can assume the second stage SCI content as same as before. As a UE procedure when the UE does not decode the second stage SCI, the UE may not attempt to decode the transport block of PSSCH.

For UE behavior for GC communication, a UE can decode the first stage SCI as part of the sensing procedure at every possible time slot. From the destination ID/destination group ID, the UE can know whether it can/needs to decode PSSCH. If the UE can/needs to decode PSSCH transmission, then the UE can transmit either a UC SCI/SFCI to the transmitting UE, if the source ID is known from the first stage SCI or the UE can GC/BC to the destination group ID requesting the second stage SCI transmission. Otherwise, the UE can mark the used PSSCH resources for resource selection and can ignore decoding the PSSCH.

According to possible embodiments, fast varying first stage SCI can be configured/determined. The fast varying first stage SCI can contain sensing related resource reservation information that can aid the anonymous UEs in finding empty resources, by indicating what resources are being used by the transmitting UE, plus the first stage SCI. The first stage SCI can be continuously transmitted. A slow-varying second stage SCI can be configured/determined. The second stage SCI need not be transmitted in all time slots. The second stage SCI can be transmitted. The second stage SCI is transmitted less often than the first stage SCI.

The first stage SCI can include an indication that indicates when the second stage SCI will be transmitted, modification periodicity, a bit that indicates the presence or absence of second stage, and/or an implicit indication based on an invalid/valid RB assignment for the second stage SCI. For example, a modification period can be a period during which changes to a control channel, such as a multipoint control channel, can be indicated/notified.

The first stage SCI can include information including resource allocation of a second control channel for the second stage SCI, transmission periodicity of the second stage SCI, second stage SCI format, second stage SCI sizes, and/or second stage SCI aggregation level.

Second stage content from a previously transmitted second stage SCI can be used as a current SCI if the second stage SCI is not being subsequently transmitted.

According to possible embodiments, fast varying first stage SCI can be received. The fast varying first stage SCI can contain sensing related resource reservation information that aids anonymous UEs to find empty resources, can contain the first stage SCI, and can contain second stage SCI. The first stage SCI can be continuously received. Slow varying second stage SCI can be received. The slow varying second stage SCI need not be transmitted in all time slots. The second stage SCI can be received less often than the first stage SCI.

The first stage SCI can include an indication that indicates when the second stage SCI will be transmitted, modification periodicity, a bit that indicates the presence or absence of second stage, and/or an implicit indication based on an invalid/valid RB assignment for the second stage SCI.

Second stage SCI content can be assumed to be the same as a previous second stage SCI if a later second stage SCI is not received. For example, a receiving UE can determine the second stage SCI content as same as before.

A TB of a PSSCH can be abstained from being decoded if the first stage SCI does not indicate second stage SCI is being transmitted, indicates the second stage SCI is not being transmitted, and/or a modification period timer has not expired. For example, a receiving UE may not monitor, such as attempt to decode, the TB of the PSSCH. The first stage SCI can be decoded as part of a sensing procedure at every possible time slot and from the destination ID/destination group ID. A determination can be made as to whether a PSSCH needs to be decoded If the PSSCH needs to be decoded, a UC SCI/SFCI can be transmitted to a UE that transmitted the first stage SCI, if the source identifier is known from the first stage SCI. Alternately, a GC/BC transmission can be sent to the destination group identifier requesting the Second stage SCI transmission.

Used PSSCH resources can be marked for resource selection. Decoding PSSCH can be ignored if the PSSCH does not need to be decoded.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   determining, at a user equipment, first stage sidelink control information, the first stage sidelink control information including information indicating whether or not a second stage sidelink control information is being transmitted;
   periodically transmitting, by the user equipment, the first stage sidelink control information;
   determining the second stage sidelink control information; and
   transmitting the second stage sidelink control information.

2. The method according to claim 1, wherein the information in the first stage sidelink control information indicates the periodicity of the second stage sidelink control information.

3. The method according to claim 1, wherein the second stage sidelink control information is transmitted less often than the first stage sidelink control information.

4. The method according to claim 1, wherein the information in the first stage sidelink control information comprises a presence indicator bit that indicates at least one selected from whether or not the second stage sidelink control information is being transmitted and whether or not the second stage sidelink control information should be decoded by at least one receiving user equipment.

5. The method according to claim 1, wherein the information in the first stage sidelink control information comprises an invalid resource assignment, where the invalid resource assignment indicates the second stage sidelink control information is not being transmitted.

6. The method according to claim 1, further comprising receiving a negative acknowledgement in a sidelink feedback channel when a receiving device does not decode the second stage sidelink control information.

7. The method according to claim 1, further comprising reusing second stage sidelink control information time-frequency resources for data transmission when the second stage sidelink control information is not being transmitted on the second stage sidelink control information time-frequency resources.

8. The method according to claim 1,
   wherein the second stage sidelink control information comprises first second stage sidelink control information,
   wherein the method further comprises:
      receiving a request to transmit updated scheduling information; and
      transmitting updated scheduling information in a second second stage sidelink control information in response to receiving the request to transmit updated scheduling information.

9. The method according to claim 1,
   wherein the first stage sidelink control information includes a modification period of the second stage sidelink control information, and
   wherein the method further comprises transmitting data on a physical sidelink shared channel based on the second stage sidelink control information until the modification period expires.

10. The method according to claim 1,
wherein periodically transmitting the first stage sidelink control information comprises groupcasting the first stage sidelink control information to a group of user equipments,
wherein the method further comprises:
receiving a communication from a user equipment that is new to the group of user equipments after transmitting the second stage sidelink control information; and
retransmitting the second stage sidelink control information in response to receiving the communication.

11. The method according to claim 1, wherein the second stage sidelink control information is transmitted on at least one selected from a physical sidelink shared channel resource and a physical sidelink control channel resource.

12. The method according to claim 1, further comprising determining whether to transmit two-stage sidelink control information,
wherein the first stage sidelink control information is determined in response to determining to transmit two-stage sidelink control information, and
wherein the second stage sidelink control information is determined in response to determining to transmit two-stage sidelink control information.

13. An apparatus comprising:
a controller that
determines first stage sidelink control information, the first stage sidelink control information including information indicating whether or not a second stage sidelink control information is being transmitted, and
determines the second stage sidelink control information; and
a transceiver that
periodically transmits the first stage sidelink control information, and
transmits the second stage sidelink control information.

14. The apparatus according to claim 13, wherein the information in the first stage sidelink control information indicates the periodicity of the second stage sidelink control information.

15. The apparatus according to claim 13, wherein the information in the first stage sidelink control information comprises a presence indicator bit that indicates at least one selected from whether or not the second stage sidelink control information is being transmitted and whether or not the second stage sidelink control information should be decoded by at least one receiving user equipment.

16. The apparatus according to claim 13, wherein the information in the first stage sidelink control information comprises an invalid resource assignment, where the invalid resource assignment indicates the second stage sidelink control information is not being transmitted.

17. The apparatus according to claim 13, wherein the controller reuses time-frequency resources allocated for second stage sidelink control information for data transmission when the second stage sidelink control information is not being transmitted on the second stage sidelink control information time-frequency resources.

18. The apparatus according to claim 13,
wherein the second stage sidelink control information comprises first second stage sidelink control information,
wherein the transceiver
receives a request to transmit updated scheduling information; and
transmits updated scheduling information in a second second stage sidelink control information in response to receiving the request to transmit updated scheduling information.

19. The apparatus according to claim 13,
wherein the first stage sidelink control information includes a modification period of the second stage sidelink control information, and
wherein transceiver transmits data on a physical sidelink shared channel based on the second stage sidelink control information until the modification period expires.

20. The apparatus according to claim 13,
wherein the transceiver
periodically transmits the first stage sidelink control information by groupcasting the first stage sidelink control information to a group of user equipments,
receives a communication from a user equipment that is new to the group of user equipments after transmitting the second stage sidelink control information, and
retransmits the second stage sidelink control information in response to receiving the communication.

* * * * *